United States Patent [19]

Wilson

[11] 3,918,368
[45] Nov. 11, 1975

[54] ADJUSTABLE RAMP
[75] Inventor: James D. Wilson, Newport Beach, Calif.
[73] Assignee: Banner Metals Division Intercole Automation, Inc., Compton, Calif.
[22] Filed: Dec. 19, 1974
[21] Appl. No.: 534,635

[52] U.S. Cl. .................. 104/134; 193/38; 193/41; 214/85
[51] Int. Cl.² ........................................ B65G 11/12
[58] Field of Search ............................ 104/30–33, 104/130, 132, 134, 135, 107; 214/85, 99, 334, 505, 515, 517; 193/38, 41; 14/71; 108/55; 296/61

[56] References Cited
UNITED STATES PATENTS
1,391,607  9/1921  Bourgeois ........................... 214/85
2,989,163  6/1961  O'Donnell ......................... 214/85 X
3,524,412  8/1970  Wilson .............................. 214/85 X Primary Examiner—Lloyd L. King
Assistant Examiner—Andres Kashnikow
Attorney, Agent, or Firm—Jessup & Beecher

[57] ABSTRACT

An adjustable ramp is provided for loading and unloading wheeled racks onto or from a truck, so that trays suspended in the racks will be maintained in a substantially horizontal position, the ramp assuring that there will be no tendency for the racks to tilt or fall over, or for the contents of the trays to spill out, while the racks are being loaded or unloaded.

3 Claims, 4 Drawing Figures

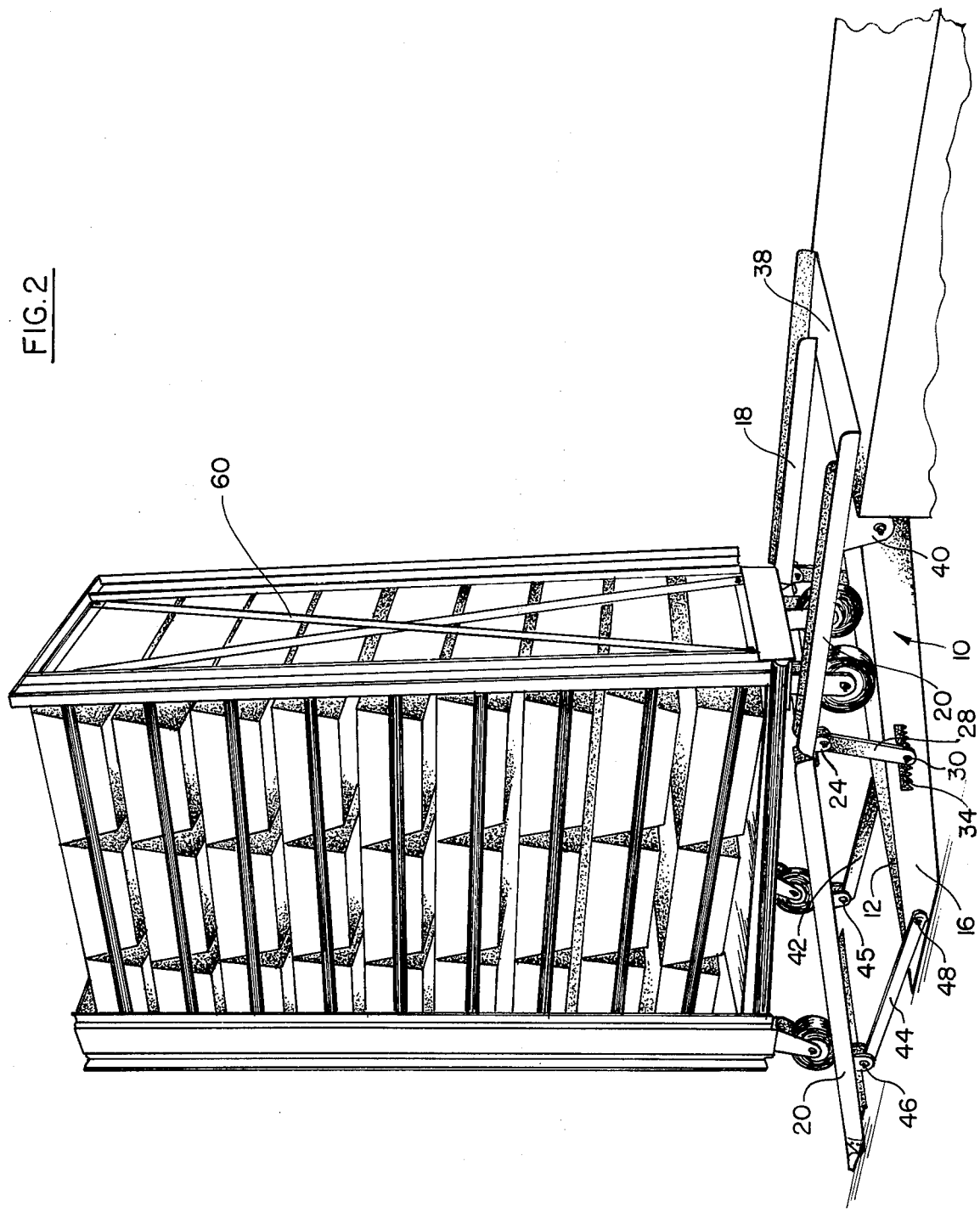

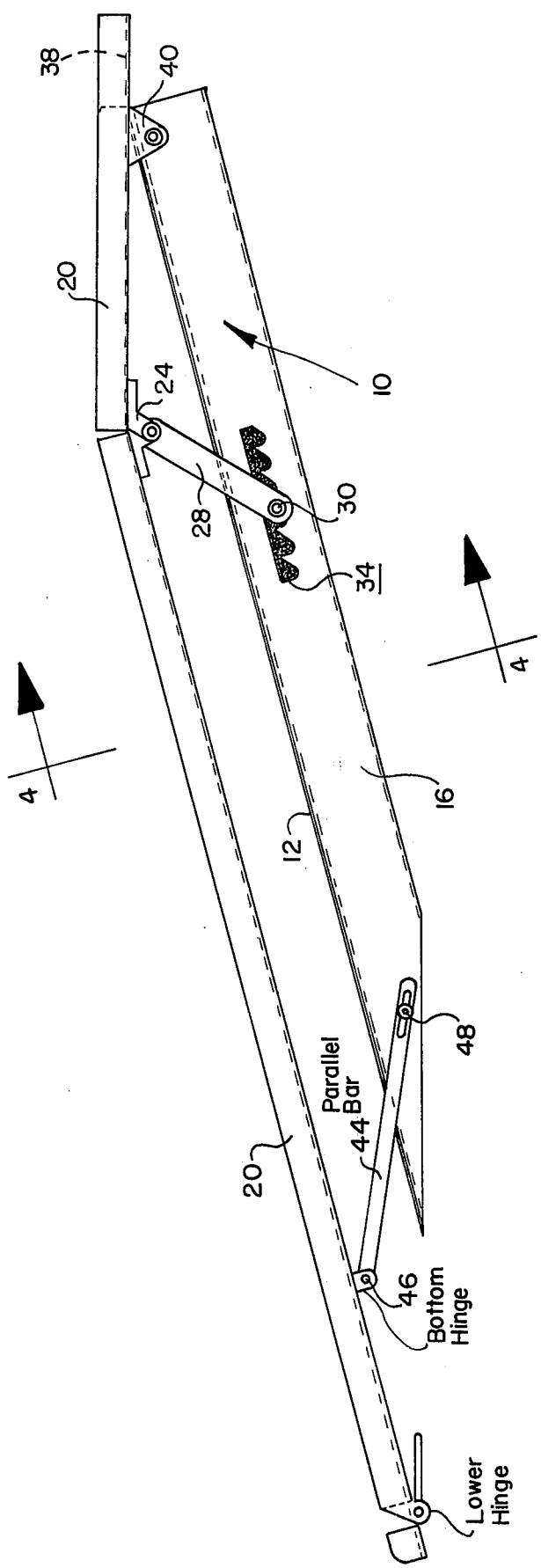

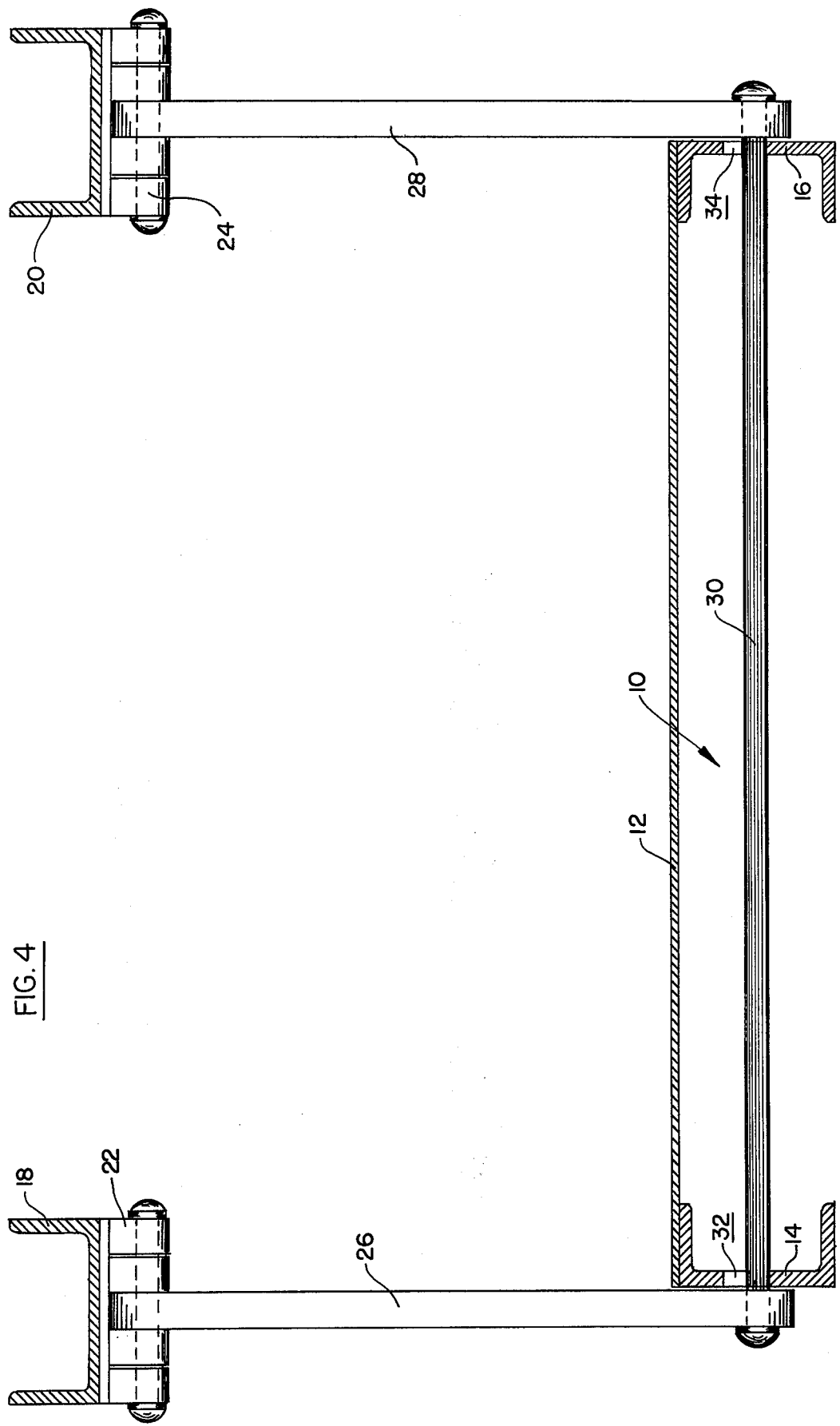

ADJUSTABLE RAMP

BACKGROUND OF THE INVENTION

It is the usual prior art practice to provide wheeled racks for the transport of trays of mail, groceries, hardware, or the like, the trays being suspended in the racks in a tiered condition. It is often necessary to load or unload the racks between a truck and a loading platform which is at a different level from the level of the bed of the truck. The ramp of the invention is particularly suited for such a purpose because it provides for the loading or unloading of the racks with the racks being maintained in a generally upright position and with the trays therein being retained in a horizontal position.

The ramp to be described provides an inclined deck which, for example, may extend between the surface of a loading dock and the rear edge of a truck bed. The assembly also includes a pair of hinged side channels positioned at the opposite sides of the deck, and which are linked to the deck in such a way that the side channels may be adjusted to assume different elevations with respect to the surface of the deck. The rear casters of the wheeled rack to be used in conjunction with the ramp assembly are spaced apart a particular distance so that they will engage the deck surface of the ramp, whereas the front casters of the rack are spaced further apart than the rear casters so that they will engage the respective channels. Therefore, the wider spaced front casters of the rack are guided by the adjustable spaced side channels, whereas the narrower spaced rear casters roll down the surface of the deck itself. The side channels may be adjusted so that for any particular inclination of the deck, the relationship between the side channels and the deck surface is such that the rack is maintained in a generally upright position, as it is wheeled up or down the ramp.

The adjustable ramp assembly of the invention is of the same general type as the ramp described in U.S. Pat. No. 3,524,412 which issued Aug. 18, 1970 in the name of the present inventor, and which is assigned to the present assignee. However, the ramp described in the patent does not have the adjustability feature of the ramp assembly of the present invention, which will now be described.

BRIEF DESCRIPTION OF THE DRAWINGS

FIG. 2 is a perspective side view of the ramp assembly of FIG. 1, generally similar to the representation of FIG. 1, but showing the wheeled rack in an intermediate position on the ramp assembly;

FIG. 3 is a side view of the ramp assembly of FIGS. 1 and 2; and

FIG. 4 is a section taken along the lines 4—4 of FIG. 3.

DETAILED DESCRIPTION OF THE ILLUSTRATED EMBODIMENT

Figure 1:
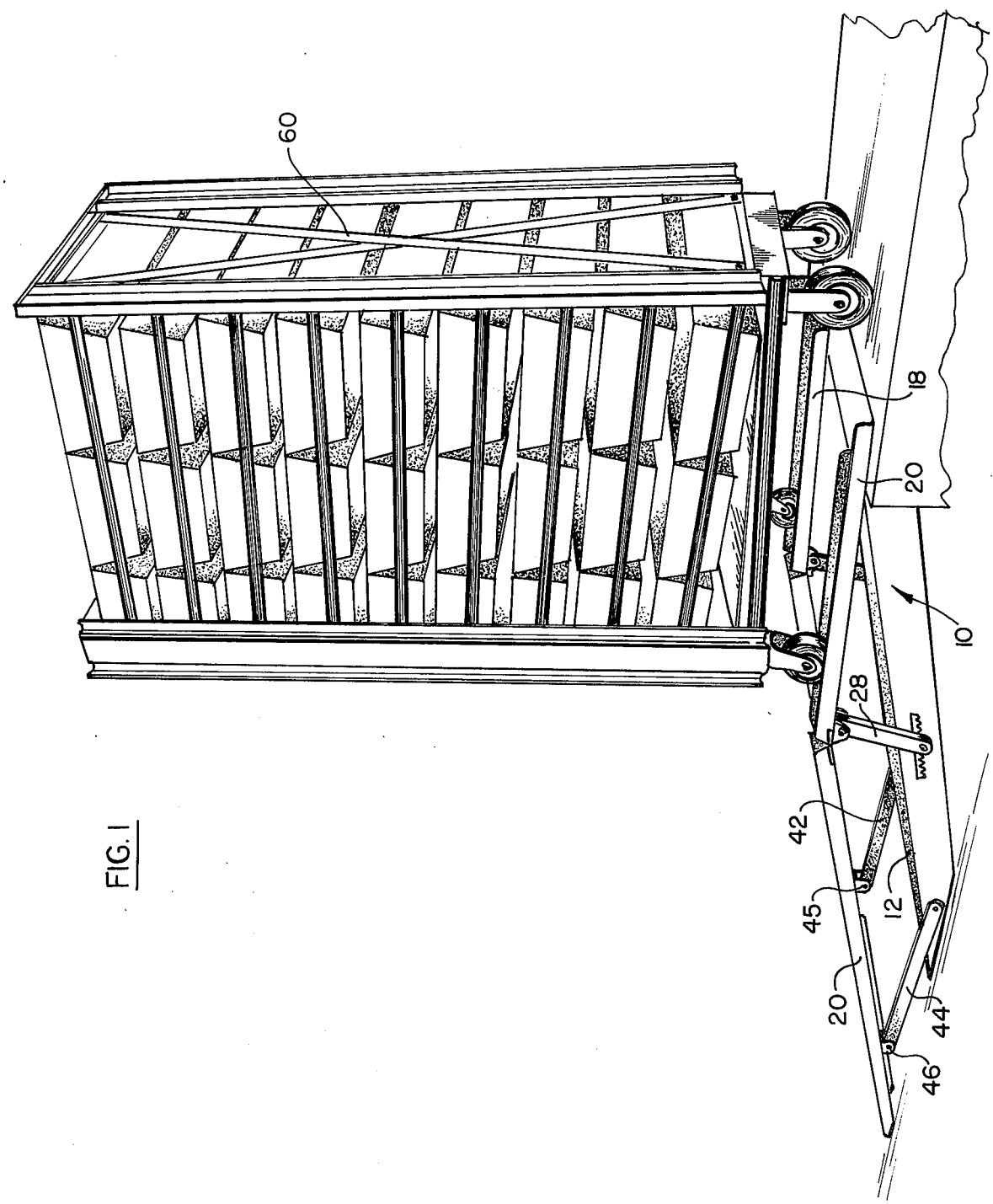
FIG. 1 is a side perspective representation of a ramp assembly constructed in accordance with one embodiment of the invention, and of a wheeled rack in the process of being wheeled down the ramp, the representation of FIG. 1 showing the wheeled rack as it is first moved onto the ramp.

As best shown in FIGS. 3 and 4, the ramp assembly of the illustrated embodiment includes a main ramp 10 which comprises a deck plate 12 supported on a pair of side channels 14 and 16. The assembly also includes a pair of side channels 18 and 20, the side channels being hinged at an intermediate point by the hinges 22 and 24. The hinges 22 and 24 are pivotally supported by respective support bars 26 and 28 which, in turn, are pivotally supported on a transverse bar 30, which extends through slots 32 and 34 in the side channel 14 and 16. The lower edges of the slots are serrated, so that the cross bar 30 may be set to different positions along the slot so as to support the channels 18 and 20 at different inclinations, depending upon the position of the cross bar 30.

The upper ends of the channels 18 and 20 are attached to a plate 38 having turned up sides, and which extends over the edges of the truck bed, for example, to constitute an entrance or an exit for the ramp assembly. The upper ends of the side channels 18 and 20 are hinged to the side of the deck 12 by hinges, such as hinge 40. The lower end of the deck 12 is shaped to engage the surface of the loading dock, for example, and that end is coupled to the side channels 18 and 20 by a pair of parallel bars 42, 44. The bar 42 is hinged to the side channel 18 by a hinge 45, and the bar 44 is hinged to the side channel 20 by a hinge 46. The other ends of the bars 42 and 44 are pivotally mounted to the lower end of the deck 12 by a pair of pins, such as pin 48, which are received in corresponding slots in the bars 42 and 44.

As shown in FIGS. 1 and 2, the ramp assembly of the invention is adjusted by setting the cross bar 30 to a particular position in the serrations of the slots 32 and 34, so that the bars 26 and 28 have a particular inclination, so as to provide a desired configuration to the side rails 18 and 20. This configuration is such that the portions of the side rails to the right in FIGS. 1 and 2 are generally horizontal, while the portions to the left in FIGS. 1 and 2 are inclined and generally parallel to the inclination of the deck 12. This way, when the loaded wheeled rack, such as the rack 60 is first wheeled onto the ramp assembly from the truck, its front wheels roll along the horizontal portions of the side rails 18 and 20, as shown in FIG. 1, to maintain the rack in a generally upright position, so long as its rear wheels are still engaged with the bed of the truck. However, when the rear wheels enter the inclined deck surface 12, to roll down the deck surface, the forward wheels then move to the inclined portions of the side channels 18 and 20, as shown in FIG. 2, so that the wheeled rack is still maintained in an upright position, as it rolls down the ramp.

With the adjustable assembly of the present invention, therefore, the wheeled rack 60 may be held generally upright, so that the trays suspended in the rack are maintained in a horizontal position, as the rack is rolled from the truck down the ramp from the loading dock, or vice versa.

The invention provides, therefore, an improved ramp assembly which may be conveniently carried in a truck, and which is most useful in loading and unloading wheeled racks of trays into the truck and out of the truck, as described above.

It will be appreciated that although a particular embodiment of the invention has been shown and described, modifications may be made. It is intended in the claims to cover the modifications which come within the true spirit and scope of the invention.

What is claimed is:

1. A ramp assembly for loading and unloading a wheeled rack between a lower surface and an upper surface, said wheeled rack having a first pair of wheels and a second pair of wheels at the respective ends thereof with the wheels of the first pair being displaced apart a greater distance than the wheels of the second pair, said assembly including: a generally rectangular structure to be placed in an inclined position between the upper surface and the lower surface to define an inclined surface for receiving the wheels of the second pair; a pair of side channels mounted at the respective sides of the rectangular structure and displaced upwardly from the inclined surface thereof to receive the wheels of the first pair, each of the side channels including a first section and a second section hinged to one another at an intermediate point; means for raising and lowering the intermediate point of each of the side channels to establish a first section of each of the side channels in a generally horizontal position, and to establish the second section of each of the side channels in a position essentially parallel to the inclined surface of the rectangular structure, said last-named means comprising a pair of side bars pivotally coupling the respective side channels to the corresponding side of the rectangular structure; and adjustable means for supporting at least one end of each of the side bars at different pivotal positions to permit the intermediate point of each of the side channels to be established at different levels with respect to the inclined surface of the rectangular structure.

2. The assembly defined in claim 1, in which the sides of said rectangular structure have respective slots therein each defining a serrated lower edge to constitute said adjustable means, and in which said raising means further comprises a further bar extending transversely of said structure and through said slots, said pair of side bars pivotally coupling said further bar to said side channels.

3. The assembly defined in claim 2, in which each of said side channels is hinged at one end to the corresponding side of said rectangular structure at one end thereof, and which includes a pair of spaced and parallel bars hinged to the side channels and pivotally coupled to the other end of said rectangular structure.

* * * * *